United States Patent
Repper et al.

(10) Patent No.: US 9,108,290 B2
(45) Date of Patent: *Aug. 18, 2015

(54) MULTILAYER CHEMICAL MECHANICAL POLISHING PAD

(71) Applicants: Rohm and Haas Electronic Materials CMP Holdings, Inc., Newark, DE (US); Dow Global Technologies LLC, Midland, MI (US)

(72) Inventors: Angus Repper, Lincoln Univeristy, PA (US); Marty W. DeGroot, Middletown, DE (US)

(73) Assignees: Rohm and Haas Electronic Materials CMP Holdings, Inc., Newark, DE (US); Dow Global Technologies LLC, Midland, MI (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/788,594

(22) Filed: Mar. 7, 2013

(65) Prior Publication Data

US 2014/0256230 A1  Sep. 11, 2014

(51) Int. Cl.
*B24B 37/20* (2012.01)
*B24B 37/04* (2012.01)
*B24B 37/22* (2012.01)
*B24B 37/24* (2012.01)
*B32B 37/12* (2006.01)

(52) U.S. Cl.
CPC ............ *B24B 37/205* (2013.01); *B24B 37/042* (2013.01); *B24B 37/22* (2013.01); *B24B 37/24* (2013.01); *B32B 37/1284* (2013.01)

(58) Field of Classification Search
CPC .... B24B 37/04; B24B 37/042; B24B 37/205; B24B 37/22; B24B 37/24; B24B 37/26; B24B 37/1284

See application file for complete search history.

(56) References Cited

U.S. PATENT DOCUMENTS

| | | | |
|---|---|---|---|
| 6,458,014 B1 | 10/2002 | Ihsikawa et al. | |
| 7,255,629 B2 | 8/2007 | Birang et al. | |
| 7,306,507 B2 | 12/2007 | Benvegnu et al. | |
| 7,731,568 B2 * | 6/2010 | Shimomura et al. | 451/41 |
| 7,871,309 B2 * | 1/2011 | Ogawa et al. | 451/41 |
| 2003/0129931 A1 * | 7/2003 | Konno et al. | 451/285 |
| 2005/0148183 A1 * | 7/2005 | Shiro et al. | 438/692 |

(Continued)

OTHER PUBLICATIONS

Copending U.S. Appl. No. 13/788,485.

(Continued)

*Primary Examiner* — Timothy V Eley
(74) *Attorney, Agent, or Firm* — Thomas S. Deibert

(57) ABSTRACT

A multilayer chemical mechanical polishing pad is provided, having: a polishing layer having a polishing surface, a counterbore opening, a polishing layer interfacial region parallel to the polishing surface; a porous subpad layer having a bottom surface and a porous subpad layer interfacial region parallel to the bottom surface; and, a broad spectrum, endpoint detection window block; wherein the polishing layer interfacial region and the porous subpad layer interfacial region form a coextensive region; wherein the multilayer chemical mechanical polishing pad has a through opening that extends from the polishing surface to the bottom surface of the porous subpad layer; wherein the counterbore opening opens on the polishing surface, enlarges the through opening and forms a ledge; and, wherein the broad spectrum, endpoint detection window block is disposed within the counterbore opening.

10 Claims, 6 Drawing Sheets

(56) References Cited

U.S. PATENT DOCUMENTS

2010/0099344 A1\* 4/2010 String et al. .................. 451/533
2010/0330879 A1  12/2010 Paik et al.
2014/0256232 A1\* 9/2014 Repper et al. ................... 451/41

OTHER PUBLICATIONS

Copending U.S. Appl. No. 13/788,814.
Copending U.S. Appl. No. 13/788,892.

\* cited by examiner

MULTILAYER CHEMICAL MECHANICAL POLISHING PAD

The present invention relates generally to the field of polishing pads for chemical mechanical polishing. In particular, the present invention is directed to multilayer chemical mechanical polishing pads having a plug in place window.

Chemical mechanical planarization, or chemical mechanical polishing (CMP), is a common technique used to planarize or polish workpieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. A polishing medium is optionally dispensed onto the polishing pad and flows into the gap between the wafer and polishing layer. To effect polishing, the polishing pad and wafer typically rotate relative to one another. The wafer surface is polished and made planar by chemical and mechanical action of the polishing layer and polishing medium on the surface.

An important step in planarizing a wafer is determining an endpoint to the process. One popular in situ method for endpoint detection involves providing a polishing pad with a window, which is transparent to select wavelengths of light. During polishing, a light beam is directed through the window to the wafer surface, where it reflects and passes back through the window to a detector (e.g., a spectrophotometer). Based on the return signal, properties of the wafer surface (e.g., the thickness of films) can be determined for endpoint detection. A problem associated with the use of windows in polishing pads involves the leakage of polishing fluid around the window and into a porous subpad layer, which can result in undesirable variability in the polishing properties across the pad surface and during the life of the pad.

One approach to alleviating window leakage in polishing pads is disclosed in U.S. Pat. No. 6,524,164 to Tolles. Tolles discloses a polishing pad for a chemical mechanical polishing apparatus and a method of making the same, wherein the polishing pad has a bottom layer, a polishing surface on a top layer and a transparent sheet of material interposed between the two layers. The transparent sheet is disclosed by Tolles to prevent slurry from the chemical mechanical polishing process from penetrating into the bottom layer of the polishing pad.

To alleviate delamination problems associated with some multilayer polishing pads (i.e., wherein the polishing layer separates from a subpad layer during polishing), some multilayer chemical mechanical polishing pads are constructed by directly bonding a polishing layer to a porous subpad layer, wherein the porous subpad layer is permeable to various polishing media (e.g., slurry) used during polishing. The approach to alleviating window leakage disclosed by Tolles does not lend itself for use with such polishing pads in which the construction does not facilitate the inclusion of an impermeable layer material between the polishing layer and a porous subpad layer.

Another approach to alleviating window leakage in polishing pads is disclosed in U.S. Pat. No. 7,163,437 (Swedek et al.). Swedek et al. disclose a polishing pad that includes a polishing layer having a polishing surface, a backing layer with an aperture and a first portion that is permeable to liquid, and a sealant that penetrates a second portion of the backing layer adjacent to and surrounding the aperture such that the second portion is substantially impermeable to liquid. The second portion into which the sealant material penetrates exhibits a decreased compressibility relative to the rest of the backing layer. Given that the window sealing region is within the polishing track, the same thickness, decreased compressibility second portion acts like a speed bump during polishing operations resulting in an increased potential for the creation of polishing defects.

Accordingly, there is a continuing need for new low defectivity multilayer window polishing pad configurations, wherein window leakage into the subpad layer is alleviated.

The present invention provides a multilayer chemical mechanical polishing pad for polishing a substrate selected from at least one of a magnetic substrate, an optical substrate and a semiconductor substrate; comprising: a polishing layer having a polishing surface, a counterbore opening, an outer perimeter, a polishing layer interfacial region parallel to the polishing surface and an average non-interfacial region thickness, $T_{P\text{-}avg}$, measured in a direction perpendicular to the polishing surface from the polishing surface to the polishing layer interfacial region; a porous subpad layer having a bottom surface, an outer perimeter and a porous subpad layer interfacial region parallel to the bottom surface; a pressure sensitive adhesive layer; and, a broad spectrum, endpoint detection window block; wherein the polishing layer interfacial region and the porous subpad layer interfacial region form a coextensive region; wherein the coextensive region secures the polishing layer to the porous subpad layer without the use of a laminating adhesive; wherein the pressure sensitive adhesive layer is applied to the bottom surface of the porous subpad layer; wherein the multilayer chemical mechanical polishing pad has a through opening that extends from the polishing surface to the bottom surface of the porous subpad layer; wherein the counterbore opening opens on the polishing surface, enlarges the through opening and forms a ledge; wherein the counterbore opening has an average depth, $D_{O\text{-}avg}$, from a plane of the polishing surface to the ledge measured in a direction perpendicular to the polishing surface; wherein the average depth, $D_{O\text{-}avg}$, is less than the average non-interfacial region thickness, $T_{P\text{-}avg}$; wherein the broad spectrum, endpoint detection window block is disposed within the counterbore opening; wherein the broad spectrum, endpoint detection window block is bonded to the polishing layer; and, wherein the polishing surface is adapted for polishing the substrate.

The present invention provides a multilayer chemical mechanical polishing pad for polishing a substrate selected from at least one of a magnetic substrate, an optical substrate and a semiconductor substrate; comprising: a polishing layer having a polishing surface, a counterbore opening, an outer perimeter, a polishing layer interfacial region parallel to the polishing surface and an average non-interfacial region thickness, $T_{P\text{-}avg}$, measured in a direction perpendicular to the polishing surface from the polishing surface to the polishing layer interfacial region; a porous subpad layer having a bottom surface, an outer perimeter and a porous subpad layer interfacial region parallel to the bottom surface; a pressure sensitive adhesive layer; and, a broad spectrum, endpoint detection window block; wherein the polishing layer interfacial region and the porous subpad layer interfacial region form a coextensive region; wherein the coextensive region secures the polishing layer to the porous subpad layer without the use of a laminating adhesive; wherein the pressure sensitive adhesive layer is applied to the bottom surface of the porous subpad layer; wherein the multilayer chemical mechanical polishing pad has a through opening that extends from the polishing surface to the bottom surface of the porous subpad layer; wherein the counterbore opening opens on the polishing surface, enlarges the through opening and forms a ledge; wherein the counterbore opening has an average depth, $D_{O-avg}$, from a plane of the polishing surface to the ledge measured in a direction perpendicular to the polishing surface; wherein the average depth, $D_{O-avg}$, is less than the average non-interfacial region thickness, $T_{P-avg}$; wherein the broad spectrum, endpoint detection window block is disposed within the counterbore opening; wherein the broad spectrum, endpoint detection window block is bonded to the polishing layer; wherein the porous subpad layer has been subjected to a critical compressive force along the outer perimeter of the porous subpad layer forming an irreversibly collapsed, densified region of the porous subpad layer along the outer perimeter of the porous subpad layer; and, wherein the polishing surface is adapted for polishing the substrate.

There is provided a method for manufacturing a multilayer chemical mechanical polishing pad for polishing a substrate selected from at least one of a magnetic substrate, an optical substrate and a semiconductor substrate; comprising: providing a polishing layer having a polishing surface adapted for polishing the substrate, an outer perimeter, a polishing layer interfacial region parallel to the polishing surface and an average non-interfacial region thickness, $T_{P-avg}$, measured in a direction perpendicular to the polishing surface from the polishing surface to the polishing layer interfacial region; providing a porous subpad layer having a bottom surface, an outer perimeter and a porous subpad layer interfacial region parallel to the bottom surface; providing a pressure sensitive adhesive layer; providing a broad spectrum, endpoint detection window block; interfacing the polishing layer and the porous subpad layer forming a stack, wherein the outer perimeter of the polishing layer coincides with the outer perimeter of the porous subpad layer and wherein the polishing layer interfacial region and the porous subpad layer interfacial region form a coextensive region; providing a through opening the extends through the stack from the polishing surface to the bottom surface; providing a counterbore opening that opens on the polishing surface, enlarges the through opening and forms a ledge; wherein the counterbore opening has an average depth, $D_{O-avg}$, from a plane of the polishing surface to the ledge measured in a direction perpendicular to the polishing surface; wherein the average depth, $D_{O-avg}$, is less than the average non-interfacial region thickness, $T_{P-avg}$; disposing the broad spectrum, endpoint detection window block within the counterbore opening and bonding the broad spectrum, endpoint detection window block to the polishing layer; and, applying the pressure sensitive adhesive layer to the bottom surface of the porous subpad layer.

There is provided a method for manufacturing a multilayer chemical mechanical polishing pad for polishing a substrate selected from at least one of a magnetic substrate, an optical substrate and a semiconductor substrate; comprising: providing a polishing layer having a polishing surface adapted for polishing the substrate, an outer perimeter, a polishing layer interfacial region parallel to the polishing surface and an average non-interfacial region thickness, $T_{P-avg}$, measured in a direction perpendicular to the polishing surface from the polishing surface to the polishing layer interfacial region; providing a porous subpad layer having a bottom surface, an outer perimeter and a porous subpad layer interfacial region parallel to the bottom surface; providing a pressure sensitive adhesive layer; providing a broad spectrum, endpoint detection window block; providing a mating surface; providing a stamper with a raised feature corresponding to the irreversibly collapsed, densified region; interfacing the polishing layer and the porous subpad layer forming a stack, wherein the outer perimeter of the polishing layer coincides with the outer perimeter of the porous subpad layer and wherein the polishing layer interfacial region and the porous subpad layer interfacial region form a coextensive region; providing a through opening the extends through the stack from the polishing surface to the bottom surface; providing a counterbore opening that opens on the polishing surface, enlarges the through opening and forms a ledge; wherein the counterbore opening has an average depth, $D_{O-avg}$, from a plane of the polishing surface to the ledge measured in a direction perpendicular to the polishing surface; wherein the average depth, $D_{O-avg}$, is less than the average non-interfacial region thickness, $T_{P-avg}$; disposing the broad spectrum, endpoint detection window block within the counterbore opening and bonding the broad spectrum, endpoint detection window block to the polishing layer; placing the stack on the mating surface and pressing the stamper against the stack creating a critical compressive force to a region of the stack corresponding to the outer perimeter of the porous subpad layer, wherein the magnitude of the critical compressive force is sufficient to form an irreversibly collapsed, densified region in the porous subpad layer along the outer perimeter of the porous subpad layer; and, applying the pressure sensitive adhesive layer to the bottom surface of the porous subpad layer.

There is provided a method of polishing a substrate, comprising: providing a substrate selected from at least one of a magnetic substrate, an optical substrate and a semiconductor substrate; providing a multilayer chemical mechanical polishing pad of the present invention; providing a polishing medium at an interface between the polishing surface and the substrate; and, creating dynamic contact at the interface between the polishing surface and the substrate; wherein permeation of the polishing medium into the porous subpad layer is impeded by the polishing layer and the irreversibly collapsed, densified region.

DETAILED DESCRIPTION

The term "average total thickness, $T_{T-avg}$," as used herein and in the appended claims in reference to a multilayer chemical mechanical polishing pad having a polishing surface means the average thickness of the multilayer chemical mechanical polishing pad measured in a direction normal to the polishing surface.

The term "polishing medium" as used herein and in the appended claims encompasses particle-containing polishing solutions and non-particle-containing solutions, such as abrasive-free and reactive-liquid polishing solutions.

Figure 1:
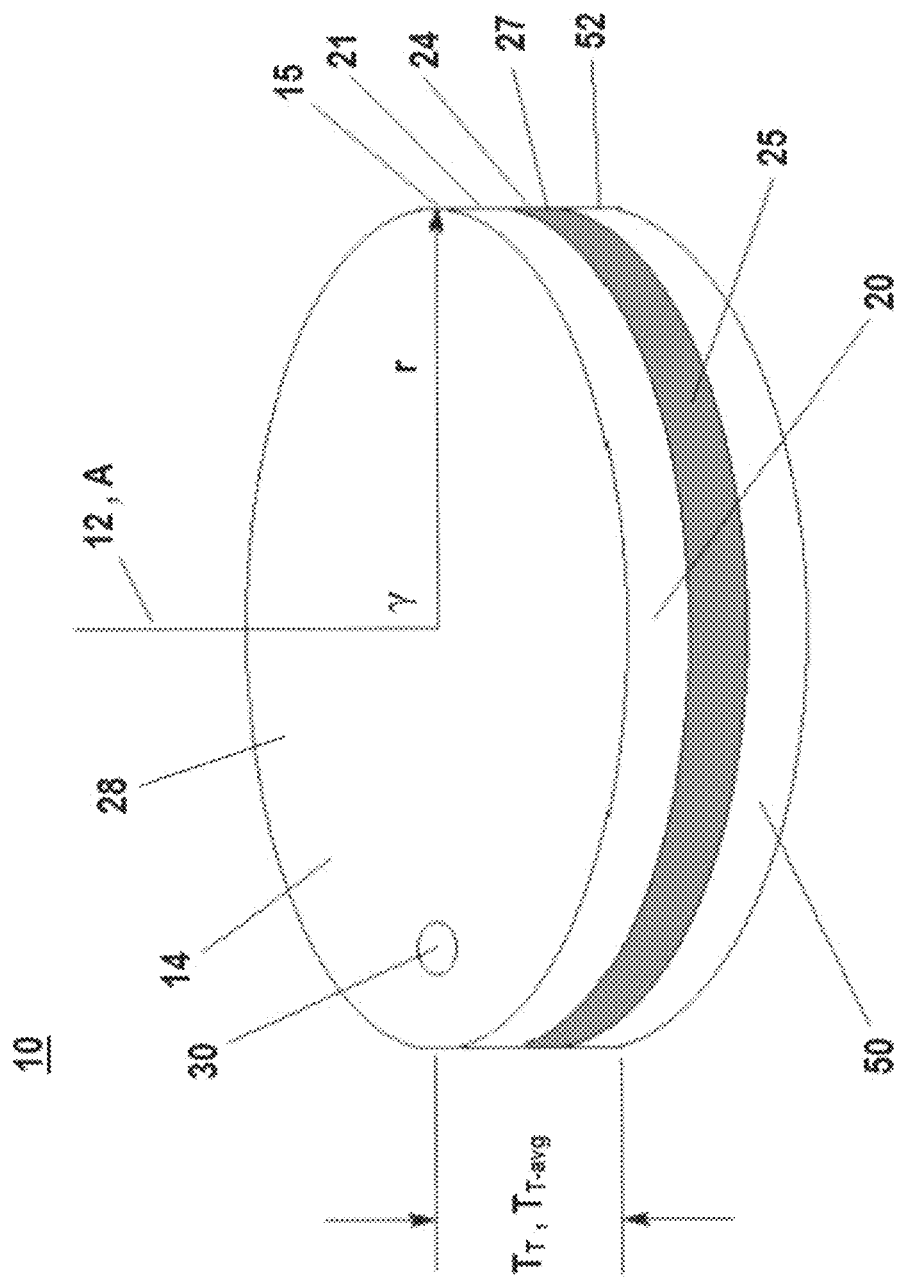
FIG. 1 is a depiction of a perspective view of a multilayer chemical mechanical polishing pad of the present invention.
Figure 2:
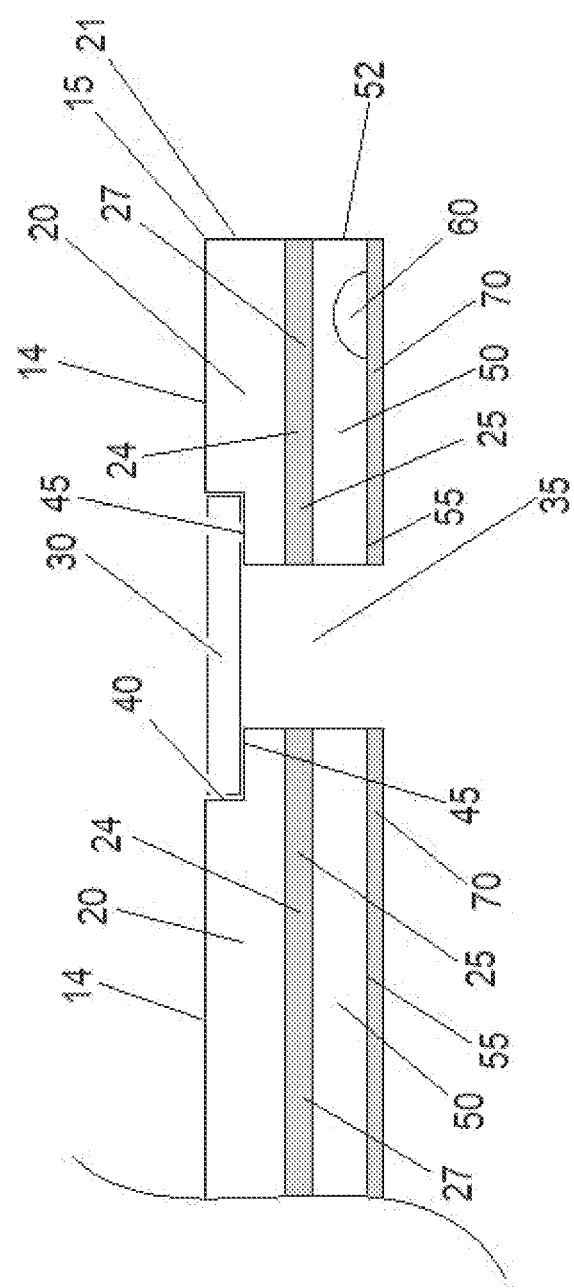
FIG. 2 is a depiction of a cross sectional cut away view of a multilayer chemical mechanical polishing pad of the present invention.
Figure 3:
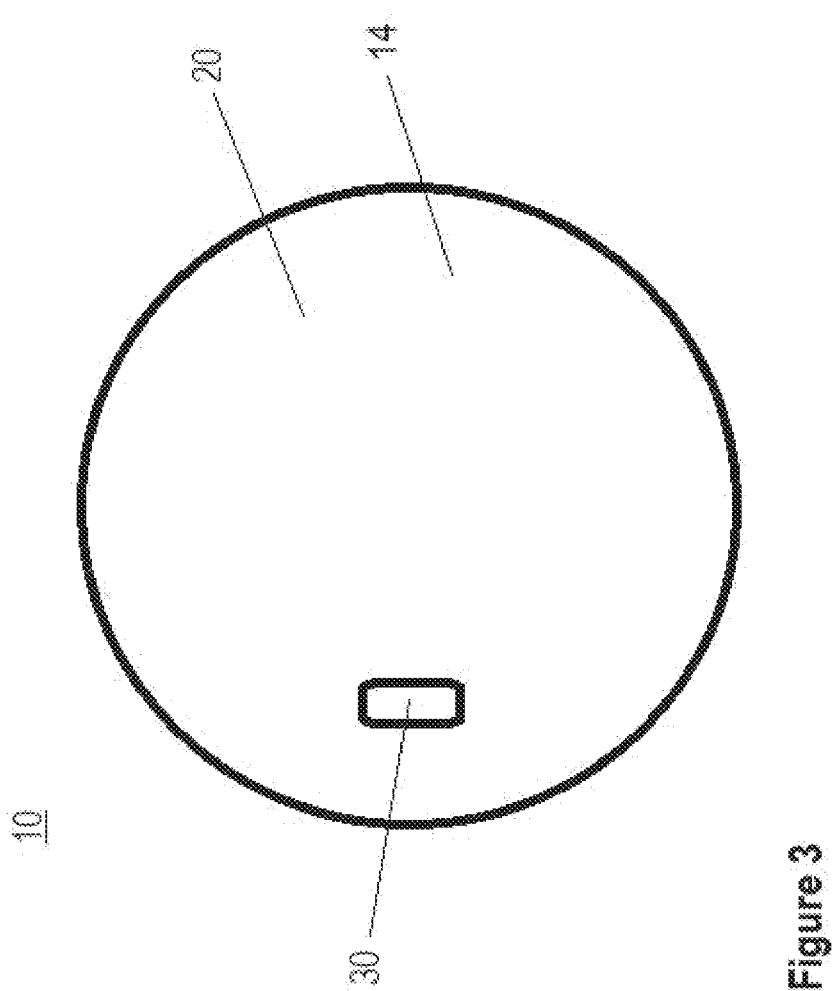
FIG. 3 is a top plan view of a multilayer chemical mechanical polishing pad of the present invention.
Figure 4:
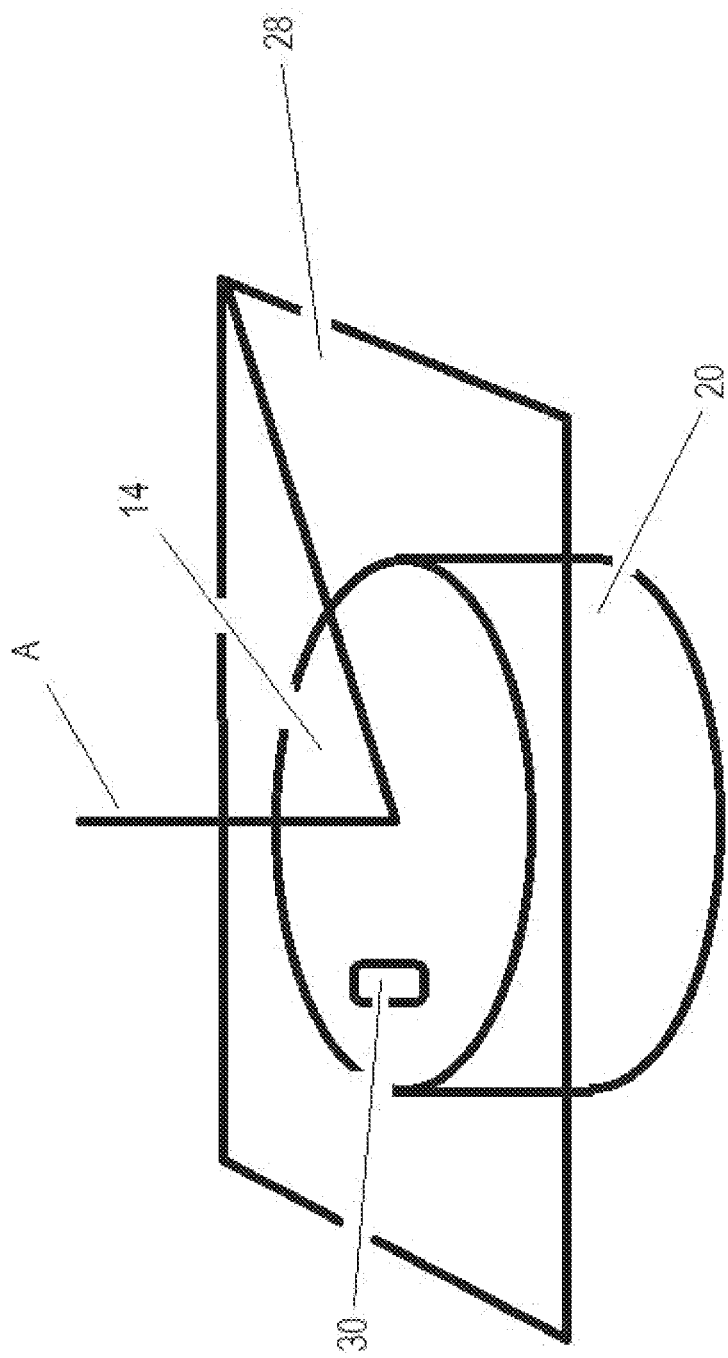
FIG. 4 is a side perspective view of a polishing layer of the present invention.
Figure 5:
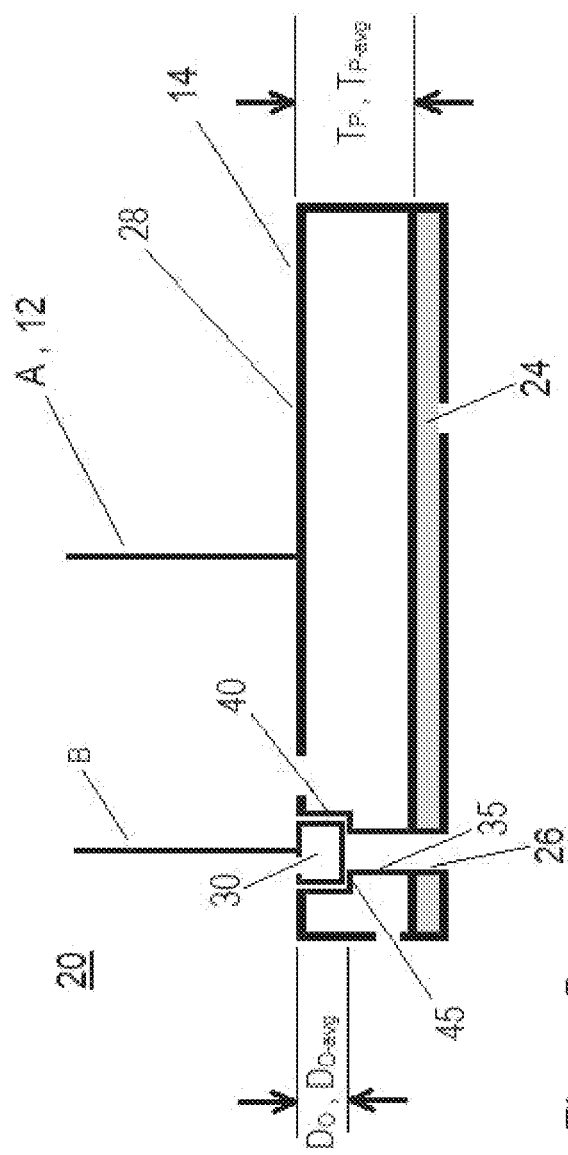
FIG. 5 is a side elevational view of a cross section of a polishing layer of a multilayer chemical mechanical polishing pad of the present invention.
Figure 6:
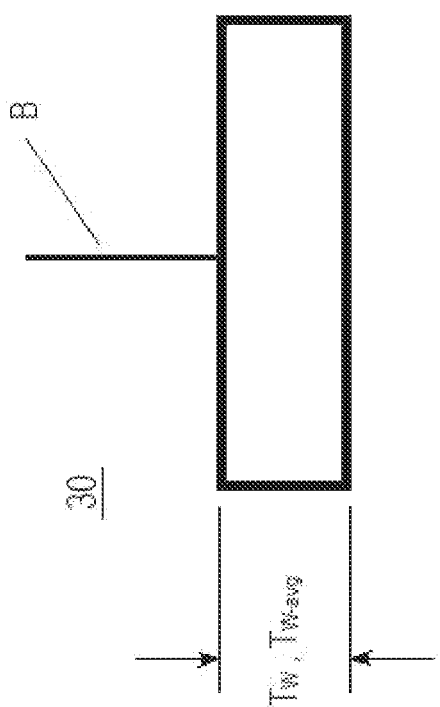
FIG. 6 is a side elevational view of a broad spectrum, endpoint detection window block.

The term "substantially circular cross section" as used herein and in the appended claims in reference to a multilayer chemical mechanical polishing pad (10) means that the longest radius, r, of the cross section from the central axis (12) to the outer perimeter (15) of the polishing surface (14) of the polishing layer (20) is ≤20% longer than the shortest radius, r, of the cross section from the central axis (12) to the outer perimeter (15) of the polishing surface (14). (See FIG. 1).

The term "poly(urethane)" as used herein and in the appended claims encompasses (a) polyurethanes formed from the reaction of (i) isocyanates and (ii) polyols (including diols); and, (b) poly(urethane) formed from the reaction of (i) isocyanates with (ii) polyols (including diols) and (iii) water, amines or a combination of water and amines.

The term "crushable porous material" as used herein and in the appended claims refers to a porous material that when subjected to a critical compressive force collapses leaving a densified (i.e., less porous) material.

The term "critical compressive force" as used herein and in the appended claims refers to a compressive force sufficient to collapse a given crushable porous material. One of ordinary skill in the art will understand that the magnitude of the critical compressive force will depend on a variety of factors including the temperature of the crushable porous material. Also, one of ordinary skill in the art will understand that the magnitude of the critical compressive force will depend on the type of force imposed on the crushable porous material (i.e., a static force or a dynamic force).

The term "substantially impermeable to water" as used herein and in the appended claims in reference to the polishing layer means that water dispensed on the polishing surface at atmospheric conditions will not permeate through the polishing layer to the porous subpad layer for at least 24 hours.

The multilayer chemical mechanical polishing pad (10) of the present invention is preferably adapted for rotation about a central axis (12). (See FIG. 1). Preferably, the polishing surface (14) of polishing layer (20) is in a plane (28) perpendicular to the central axis (12). The multilayer chemical mechanical polishing pad (10) is optionally adapted for rotation in a plane (28) that is at an angle, γ, of 85 to 95° to the central axis (12), preferably, of 90° to the central axis (12). Preferably, the polishing layer (20) has a polishing surface (14) that has a substantially circular cross section perpendicular to the central axis (12). Preferably, the radius, r, of the cross section of the polishing surface (14) perpendicular to the central axis (12) varies by ≤20% for the cross section, more preferably by ≤10% for the cross section.

The multilayer chemical mechanical polishing pad of the present invention is specifically designed to facilitate the polishing of a substrate selected from at least one of a magnetic substrate, an optical substrate and a semiconductor substrate.

Preferably, the multilayer chemical mechanical polishing pad (10) of the present invention, comprises: a polishing layer (20) having a polishing surface (14), a counterbore opening (40), an outer perimeter (21), a polishing layer interfacial region (24) parallel to the polishing surface (14) and an average non-interfacial region thickness, $T_{P-avg}$, measured in a direction perpendicular to the polishing surface (14) from the polishing surface (14) to the polishing layer interfacial region (24); a porous subpad layer (50) having a bottom surface (55), an outer perimeter (52) and a porous subpad layer interfacial region (27) parallel to the bottom surface (55); a pressure sensitive adhesive layer (70); and, a broad spectrum, endpoint detection window block (30); wherein the polishing layer interfacial region and the porous subpad layer interfacial region form a coextensive region (25)(preferably, the coextensive region is a commingled region); wherein the coextensive region (25) secures the polishing layer (20) to the porous subpad layer (50) without the use of a laminating adhesive; wherein the pressure sensitive adhesive layer (70) is applied to the bottom surface (55) of the porous subpad layer (50); wherein the multilayer chemical mechanical polishing pad (10) has a through opening (35) that extends from the polishing surface (14) to the bottom surface (55) of the porous subpad layer (50); wherein the counterbore opening (40) opens on the polishing surface (14), enlarges the through opening (35) and forms a ledge (45) (preferably, wherein the ledge (45) is parallel to the polishing surface (14)); wherein the counterbore opening (45) has an average depth, $D_{O-avg}$, from a plane (28) of the polishing surface (14) to the ledge (45) measured in a direction perpendicular to the polishing surface (14); wherein the average depth, $D_{O-avg}$, is less than the average non-interfacial region thickness, $T_{P-avg}$; wherein the broad spectrum, endpoint detection window block (30) is disposed within the counterbore opening (40); wherein the broad spectrum, endpoint detection window block (30) is bonded to the polishing layer (20); and, wherein the polishing surface (14) is adapted for polishing the substrate. (See FIGS. 1-5).

Preferably, in the multilayer chemical mechanical polishing pad of the present invention, the outer perimeter (21) of the polishing layer (20) extends beyond the outer perimeter (52) of the porous subpad layer (50) in a direction along the plane (28) of the polishing surface (14) perpendicular to the central axis (12).

Preferably, the outer perimeter (21) of the polishing layer (20) and the outer perimeter (52) of the porous subpad layer (50) coincide, wherein the outer perimeter (21) of the polishing layer (20) and the outer perimeter (52) of the porous subpad layer (50) extend an equal distance from the central axis (12) measured perpendicularly from the central axis (12).

Preferably, the coextensive region (25) comprises a direct bond between the polishing layer (20) and the porous subpad layer (50), wherein there is substantially no commingling between the layers (i.e., coextensive region ≤0.001% of the average total thickness, $T_{T-avg}$, of the multilayer chemical mechanical polishing pad). Preferably, there is interpenetration between the polishing layer (20) and the porous sub pad layer (50), wherein the polishing layer interfacial region (24) and the porous subpad layer interfacial region (27) commingle to form the coextensive region (25). Preferably, the coextensive region (25) comprises 0.001 to 5% (more preferably, 0.05 to 5%; most preferably 0.1 to 5%) of the average total thickness, $T_{T-avg}$.

Preferably, the multilayer chemical mechanical polishing pad of the present invention, further comprises: an irreversibly collapsed, densified region (60) of the porous subpad layer (50) along the outer perimeter (52) of the porous subpad layer (50). Preferably, the multilayer chemical mechanical polishing pad is subjected to a critical compressive force along the outer perimeter (52) of the porous subpad layer (50) to form the irreversibly collapsed, densified region (60). (See FIG. 2).

The counterbore opening (40) in the multilayer chemical mechanical polishing pad of the present invention preferably defines a cylindrical volume with an axis, B, that is parallel to the central axis (12). (See FIG. 5).

The counterbore opening (40) in the multilayer chemical mechanical polishing pad of the present invention preferably defines a non-cylindrical volume.

The broad spectrum, endpoint detection window block (30) in the multilayer chemical mechanical polishing pad of the present invention is disposed within the counterbore opening (40). Preferably, the broad spectrum, endpoint detection window block (30) is disposed within the counterbore opening (40) and is bonded to the polishing layer (20). Preferably, the broad spectrum, endpoint detection window block

(30) is bonded to the polishing layer (20) using at least one of thermal bonding, melt bonding, ultrasonic welding and an adhesive (preferably, the broad spectrum, endpoint detection window block is bonded to the polishing layer using combination of heat and pressure to provide a thermal bond). Preferably, the average depth of the counterbore opening, $D_{O\text{-}avg}$, along an axis, B, parallel with an axis, A, and perpendicular to the plane (28) of the polishing surface (14) is 5 to 75 mils (preferably 10 to 60 mils; more preferably 15 to 50 mils; most preferably, 20 to 40 mils). Preferably, the average depth of the counterbore opening, $D_{O\text{-}avg}$, is ≤ the average thickness, $T_{W\text{-}avg}$, of the broad spectrum, endpoint detection window block (30). (See FIG. 5). More preferably, the average depth of the counterbore opening, $D_{O\text{-}avg}$, satisfies the following expression:

$$0.90*T_{W\text{-}avg} \leq D_{O\text{-}avg} \leq T_{W\text{-}avg}.$$

Most preferably, the average depth of the counterbore opening, $D_{O\text{-}avg}$, satisfies the following expression:

$$0.95*T_{W\text{-}avg} \leq D_{O\text{-}avg} < T_{W\text{-}avg}.$$

The multilayer chemical mechanical polishing pad of the present invention is preferably adapted to be interfaced with a platen of a polishing machine. Preferably, the multilayer chemical mechanical polishing pad is adapted to be affixed to the platen of a polishing machine. The multilayer chemical mechanical polishing pad can be affixed to the platen using at least one of a pressure sensitive adhesive and vacuum.

The multilayer chemical mechanical polishing pad optionally further comprises at least one additional layer. Preferably, the at least one additional layer can be selected from a foam, a film, a woven material, and a nonwoven material. The at least one additional layer can preferably be interfaced with the bottom surface of the porous subpad layer by direct bonding or by using an adhesive. The adhesive can be selected from a pressure sensitive adhesive, a hot melt adhesive, a contact adhesive and combinations thereof. Preferably, the adhesive is selected from a pressure sensitive adhesive and a hot melt adhesive. For some polishing operations, the adhesive is preferably a pressure sensitive adhesive. For some polishing operations, the adhesive is preferably a hot melt adhesive.

In the multilayer chemical mechanical polishing pad of the present invention, a polishing layer is directly bound to a porous subpad layer. That is, the polishing layer is bound to the porous subpad layer without the use of a laminating adhesive. The polishing layer precursor material is deposited directly onto a surface of the porous subpad layer in liquid form. The polishing layer precursor material bonds to the porous subpad layer. The bonding between the polishing layer and the porous subpad layer can be physical, chemical or a combination of both. The polishing layer precursor material can flow into the porous subpad layer before solidifying. The degree of penetration of the precursor material into the porous subpad layer depends on a variety of factors including the system temperature, the viscosity of the precursor material at the system temperature, the open porosity of the porous subpad layer in the porous subpad layer interfacial region, the pressure forcing the precursor material into the porous subpad layer, the kinetics of the reaction of the precursor material (i.e., rate of solidification). The polishing layer precursor material can chemically bond to the porous subpad layer. The degree of chemical bonding formed between the polishing layer precursor material and the porous subpad layer depends on a variety of factors including the composition of each layer and the reactivity between the layers. The precursor material can be applied to the porous subpad layer in one coat. The precursor material can be applied to the porous subpad layer in a plurality of coats.

The polishing layer can comprise a solidified/polymerized material selected from poly(urethane), polysulfone, polyether sulfone, nylon, polyether, polyester, polystyrene, acrylic polymer, polyurea, polyamide, polyvinyl chloride, polyvinyl fluoride, polyethylene, polypropylene, polybutadiene, polyethylene imine, polyacrylonitrile, polyethylene oxide, polyolefin, poly(alkyl)acrylate, poly(alkyl)methacrylate, polyamide, polyether imide, polyketone, epoxy, silicone, EPDM, protein, polysaccharide, polyacetate and combinations of at least two of the foregoing materials. Preferably, the polishing layer comprises a poly(urethane). More preferably, the polishing layer comprises a polyurethane. Preferably, the polishing layer is substantially impermeable to water.

The polishing layer is preferably produced from an aqueous based fluid precursor material. Aqueous based fluid precursor materials suitable for use with the present invention include, for example, water based urethane dispersions, acrylic dispersions and combinations thereof. The aqueous based fluid precursor material preferably comprises a water based urethane dispersion (e.g. Witcobond-290H, Witcobond-293, Witcobond-320 and Witcobond-612 available from Chemtura Corporation).

The polishing layer preferably contains a plurality of microelements. Preferably, the plurality of microelements are uniformly dispersed within at least a portion of polishing layer adjacent to and coincident with the polishing surface. The plurality of microelements can be selected from entrapped gas bubbles, hollow core polymeric materials, liquid filled hollow core polymeric materials, water soluble materials and an insoluble phase material (e.g., mineral oil). The plurality of microelements can comprise hollow core polymeric materials. The plurality of microelements can comprise a hollow core copolymer of polyacrylonitrile and polyvinylidene chloride (e.g., Expancel™ from Akso Nobel of Sundsvall, Sweden).

The polishing surface preferably exhibits a macrotexture. Preferably, the macrotexture is designed to alleviate at least one of hydroplaning; to influence polishing medium flow; to modify the stiffness of the polishing layer; to reduce edge effects; and, to facilitate the transfer of polishing debris away from the area between the polishing surface and the substrate. Preferably, the polishing surface exhibits a macrotexture selected from at least one of perforations and grooves. Perforations can extend from the polishing surface part way or all of the way through the total thickness, $T_T$, of the multilayer chemical mechanical polishing pad. Grooves can be arranged on the polishing surface such that upon rotation of the pad during polishing, at least one groove sweeps over the substrate. The grooves are preferably be selected from curved grooves, linear grooves and combinations thereof.

The polishing surface preferably comprises a groove pattern. Groove patterns can comprise at least one groove. The at least one groove can be selected from curved grooves, straight grooves and combinations thereof. The groove pattern can be selected from a groove design including, for example, concentric grooves (which may be circular or spiral), curved grooves, cross-hatch grooves (e.g., arranged as an X-Y grid across the pad surface), other regular designs (e.g., hexagons, triangles), tire-tread type patterns, irregular designs (e.g., fractal patterns), and combinations of at least two of the foregoing. The groove pattern can be selected from random, concentric, spiral, cross-hatched, X-Y grid, hexagonal, triangular, fractal and combinations of at least two of the foregoing. The at least one groove can exhibit a groove profile selected from rectangular with straight side-walls or the groove cross-section may be "V"-shaped, "U"-shaped, triangular, saw-tooth, and combinations of at least two of the foregoing. The groove pattern can change across the polishing surface. The groove pattern can be engineered for a specific application. The groove dimensions in a specific groove pattern can be varied across the polishing surface to produce regions of different groove densities.

The at least one groove preferably exhibits a depth of ≥20 mils.

The groove pattern preferably comprises at least two grooves exhibiting a depth of ≥15 mils; a width of ≥10 mils and a pitch of ≥50 mils.

The porous subpad layer comprises a crushable porous material. The porous subpad layer can comprise a material selected from an open cell foam, a woven material, and a nonwoven material (e.g., felted, spun bonded, and needle punched materials). Nonwoven materials suitable for use in the porous subpad layer of the present invention include, for example, polymer impregnated felts (e.g., polyurethane impregnated polyester felts). Woven materials suitable for use in the porous subpad layer of the present invention include, for example, thick flannel materials.

The multilayer chemical mechanical polishing pads of the present invention are designed for use with a polishing medium that is provided at an interface between the polishing surface and a substrate during polishing of the substrate. Permeation of polishing medium into the porous subpad layer during polishing can result in undesirable variability in the polishing properties across the polishing surface and during the life of the polishing pad. To alleviate the potential for polishing medium permeating into the porous subpad layer during polishing, the outer perimeter of the porous subpad layer is preferably sealed by a process that irreversibly collapses a portion of the porous subpad layer. The irreversibly collapsed, densified region in the porous subpad layer exhibits a decreased thickness relative to the rest of the porous subpad layer. That is, the porous subpad layer in the irreversibly collapsed, densified region has a thickness that is less than the average thickness of the rest of the porous subpad layer (i.e., a reduced thickness, decreased compressibility region). The incorporation of decreased thickness, reduced compressibility region of the porous subpad layer of the multilayer chemical mechanical polishing pad of the present invention provides sealing without the introduction of the speed bump effect associated with same thickness, decreased compressibility regions created by certain prior art sealing methods. The porous subpad material exhibits an average void volume of 20 to 80%; preferably 50 to 60%. The irreversibly collapsed, densified region of the porous subpad layer is collapsed to reduce the void volume to ≤20%, preferably ≤10%. The relative difference in the average void volume of the edge sealed region from the average void volume of the rest of the porous subpad layer can be determined using comparative thickness measurements. Preferably, the porous subpad material exhibits an average void volume of 50 to 60% and the first and second irreversibly collapsed, densified regions of the porous subpad layer exhibit a thickness that is ≤75%, more preferably ≤70% of the average thickness of the porous subpad layer.

Preferably, the method for manufacturing a multilayer chemical mechanical polishing pad of the present invention, comprises: providing a polishing layer having a polishing surface adapted for polishing the substrate, an outer perimeter, a polishing layer interfacial region parallel to the polishing surface and an average non-interfacial region thickness, $T_{P-avg}$, measured in a direction perpendicular to the polishing surface from the polishing surface to the polishing layer interfacial region; providing a porous subpad layer having a bottom surface, an outer perimeter and a porous subpad layer interfacial region parallel to the bottom surface; providing a pressure sensitive adhesive layer; providing a broad spectrum, endpoint detection window block; interfacing the polishing layer and the porous subpad layer forming a stack, wherein the outer perimeter of the polishing layer coincides with the outer perimeter of the porous subpad layer and wherein the polishing layer interfacial region and the porous subpad layer interfacial region form a coextensive region; providing a through opening the extends through the stack from the polishing surface to the bottom surface; providing a counterbore opening that opens on the polishing surface, enlarges the through opening and forms a ledge (preferably, wherein the ledge is parallel to the polishing surface); wherein the counterbore opening has an average depth, $D_{O-avg}$, from a plane of the polishing surface to the ledge measured in a direction perpendicular to the polishing surface; wherein the average depth, $D_{O-avg}$, is less than the average non-interfacial region thickness, $T_{P-avg}$; disposing the broad spectrum, endpoint detection window block within the counterbore opening and bonding the broad spectrum, endpoint detection window block to the polishing layer; and, applying the pressure sensitive adhesive layer to the bottom surface of the porous subpad layer.

Preferably, the through opening in the multilayer chemical mechanical polishing pad of the present invention is formed using at least one of a laser, a mechanical cutting tool (e.g., a drill, a milling bit, a cutting die) and a plasma. More preferably, the through opening in the multilayer chemical mechanical polishing pad of the present invention is formed using a cutting die. Most preferably, the through opening in the multilayer chemical mechanical polishing pad of the present invention is formed by placing a mask, defining the cross section of the through opening parallel to the polishing surface, over the polishing pad and using a plasma to form the through opening.

Preferably, the counterbore opening in the multilayer chemical mechanical polishing pad of the present invention is formed using at least one of a laser, a mechanical cutting tool (e.g., a drill, a milling bit). More preferably, the through opening in the multilayer chemical mechanical polishing pad of the present invention is formed using a laser. Most preferably, the counterbore opening in the multilayer chemical mechanical polishing pad of the present invention is formed by placing a mask, defining the cross section of the counterbore opening parallel to the polishing surface, over the polishing pad and using a plasma to form the through opening.

The counterbore opening is preferably formed before, after or simultaneously with the formation of the through opening. Preferably, the counterbore opening and the through opening are formed simultaneously. More preferably, the counterbore opening is formed first followed by the formation of the through opening.

The method for manufacturing a multilayer chemical mechanical polishing pad of the present invention, optionally, further comprises: raising a temperature of and applying a critical compressive force to a region of the stack corresponding to the outer perimeter of the porous subpad layer using the sealing die, wherein the raised temperature and the magnitude of the critical compressive force are collectively sufficient to form an irreversibly collapsed, densified region in the porous subpad layer along the outer perimeter of the porous subpad layer. The pressure sensitive adhesive layer can be applied to the bottom surface of the porous subpad layer before or after the formation of the irreversibly collapsed, densified region.

The method for manufacturing a multilayer chemical mechanical polishing pad of the present invention, optionally, further comprises: providing a mating surface; providing a stamper with a raised feature corresponding to the irreversibly collapsed, densified region; wherein the stack is placed between the mating surface and the stamper; wherein the mating surface and the stamper are pressed together creating the critical compressive force forming the irreversibly collapsed, densified region in the porous subpad layer.

The mating surface can be flat. Alternatively, the mating surface can be designed to include a feature, such as, one or more raised portions or contouring. The feature included on the mating surface can be designed to facilitate the formation of the irreversibly collapsed densified region in the porous subpad layer. The feature included on the mating surface can be designed to facilitate manipulation of polishing layer so that the multilayer chemical mechanical polishing pad is biased to lie flatly on the platen of a polishing machine during polishing.

The method for manufacturing a multilayer chemical mechanical polishing pad of the present invention can, optionally, further comprise: heating at least a portion of the porous subpad layer to facilitate the formation of the irreversibly collapsed, densified region in the porous subpad layer (i.e., using both heat and pressure to form the irreversibly collapsed, densified regions).

Preferably, radio frequency welding techniques and equipment are used to facilitate the formation of the irreversibly collapsed, densified region in the porous subpad layer.

Preferably, ultrasonic welding techniques and equipment are used to facilitate the formation of the irreversibly collapsed, densified region in the porous subpad layer.

The method of the present invention for polishing a substrate, comprises: providing a substrate selected from at least one of a magnetic substrate, an optical substrate and a semiconductor substrate; providing a multilayer chemical mechanical polishing pad of the present invention; providing a polishing medium at an interface between the polishing surface and the substrate; and, creating dynamic contact at the interface between the polishing surface and the substrate; wherein permeation of the polishing medium into the porous subpad layer is impeded by the polishing layer and the irreversibly collapsed, densified region. Preferably, the coextensive region is a commingled region. Any permeation of the polishing medium into the porous subpad layer is impeded to the point that it does not negatively affect the polishing performance of the multilayer chemical mechanical polishing pad. Preferably, permeation of the polishing medium into the porous subpad layer is precluded by the polishing layer and the irreversibly collapsed, densified region under the polishing conditions used to polish the substrate.

Preferably, the method of the present invention for polishing a substrate further comprises: providing a light source; providing a light detector; providing a control system; wherein the light source directs light through the broad spectrum, endpoint detection window block in the multilayer chemical mechanical polishing pad incident on the substrate; wherein the light detector detects light reflected from the substrate; wherein the control system receives an input from the light detector and determines when a polishing endpoint is reached.

We claim:

1. A multilayer chemical mechanical polishing pad for polishing a substrate selected from at least one of a magnetic substrate, an optical substrate and a semiconductor substrate; comprising:
    a polishing layer having a polishing surface, a counterbore opening, an outer perimeter, a polishing layer interfacial region parallel to the polishing surface and an average non-interfacial region thickness, $T_{P\text{-}avg}$, measured in a direction perpendicular to the polishing surface from the polishing surface to the polishing layer interfacial region;
    a porous subpad layer having a bottom surface, an outer perimeter and a porous subpad layer interfacial region parallel to the bottom surface;
    a pressure sensitive adhesive layer; and,
    a broad spectrum, endpoint detection window block;
    wherein the polishing layer interfacial region and the porous subpad layer interfacial region form a coextensive region;
    wherein the coextensive region secures the polishing layer to the porous subpad layer without the use of a laminating adhesive;
    wherein the pressure sensitive adhesive layer is applied to the bottom surface of the porous subpad layer;
    wherein the multilayer chemical mechanical polishing pad has a through opening that extends from the polishing surface to the bottom surface of the porous subpad layer;
    wherein the counterbore opening opens on the polishing surface, enlarges the through opening and forms a ledge;
    wherein the counterbore opening has an average depth, $D_{O\text{-}avg}$, from a plane of the polishing surface to the ledge measured in a direction perpendicular to the polishing surface;
    wherein the average depth, $D_{O\text{-}avg}$, is less than the average non-interfacial region thickness, $T_{P\text{-}avg}$;
    wherein the broad spectrum, endpoint detection window block is disposed within the counterbore opening;
    wherein the broad spectrum, endpoint detection window block is bonded to the polishing layer; and,
    wherein the polishing surface is adapted for polishing the substrate.

2. The multilayer chemical mechanical polishing pad of claim 1, wherein the porous subpad layer has been subjected to a critical compressive force along the outer perimeter of the porous subpad layer forming an irreversibly collapsed, densified region of the porous subpad layer along the outer perimeter of the porous subpad layer.

3. The multilayer chemical mechanical polishing pad of claim 2, wherein the polishing surface has a macrotexture selected from at least one of perforations and grooves.

4. The multilayer chemical mechanical polishing pad of claim 2, wherein the porous subpad layer comprises an open cell foam material.

5. The multilayer chemical mechanical polishing pad of claim 2, wherein the porous subpad layer comprises a polyurethane impregnated polyester felt.

6. The multilayer chemical mechanical polishing pad of claim 2, wherein the polishing layer comprises an aqueous urethane polymer and hollow sphere polymeric microelements.

7. The multilayer chemical mechanical polishing pad of claim 2, wherein the coextensive region is a comingled region.

8. A method of polishing a substrate, comprising:
providing a substrate selected from at least one of a magnetic substrate, an optical substrate and a semiconductor substrate;
providing a multilayer chemical mechanical polishing pad according to claim 2;
providing a polishing medium at an interface between the polishing surface and the substrate; and,
creating dynamic contact at the interface between the polishing surface and the substrate;
wherein permeation of the polishing medium into the porous subpad layer is impeded by the polishing layer and the irreversibly collapsed, densified region.

9. A method for manufacturing a multilayer chemical mechanical polishing pad for polishing a substrate selected from at least one of a magnetic substrate, an optical substrate and a semiconductor substrate; comprising:
providing a polishing layer having a polishing surface adapted for polishing the substrate, an outer perimeter, a polishing layer interfacial region parallel to the polishing surface and an average non-interfacial region thickness, $T_{P\text{-}avg}$, measured in a direction perpendicular to the polishing surface from the polishing surface to the polishing layer interfacial region;
providing a porous subpad layer having a bottom surface, an outer perimeter and a porous subpad layer interfacial region parallel to the bottom surface;
providing a pressure sensitive adhesive layer;
providing a broad spectrum, endpoint detection window block;
interfacing the polishing layer and the porous subpad layer forming a stack, wherein the outer perimeter of the polishing layer coincides with the outer perimeter of the porous subpad layer and wherein the polishing layer interfacial region and the porous subpad layer interfacial region form a coextensive region;
providing a through opening the extends through the stack from the polishing surface to that bottom surface;
providing a counterbore opening that opens on the polishing surface, enlarges the through opening and forms a ledge; wherein the counterbore opening has an average depth, $D_{O\text{-}avg}$, from a plane of the polishing surface to the ledge measured in a direction perpendicular to the polishing surface; wherein the average depth, $D_{O\text{-}avg}$, is less than the average non-interfacial region thickness, $T_{P\text{-}avg}$;
disposing the broad spectrum, endpoint detection window block within the counterbore opening and bonding the broad spectrum, endpoint detection window block to the polishing layer; and,
applying the pressure sensitive adhesive layer to the bottom surface of the porous subpad layer.

10. The method of claim 9, further comprising:
providing a mating surface;
providing a stamper with a raised feature corresponding to the irreversibly collapsed, densified region;
placing the stack on the mating surface and pressing the stamper against the stack creating a critical compressive force to a region of the stack corresponding to the outer perimeter of the porous subpad layer, wherein the magnitude of the critical compressive force is sufficient to form an irreversibly collapsed, densified region in the porous subpad layer along the outer perimeter of the porous subpad layer.

* * * * *